March 29, 1966     D. PIETROROIA     3,243,060
VERTICAL GATE LIFT APPARATUS

Filed Jan. 13, 1964     2 Sheets-Sheet 1

*INVENTOR.*
DOMINIC PIETROROIA
BY
*Mellin and Hanscom*
ATTORNEYS

March 29, 1966 D. PIETROROIA 3,243,060
VERTICAL GATE LIFT APPARATUS
Filed Jan. 13, 1964 2 Sheets-Sheet 2
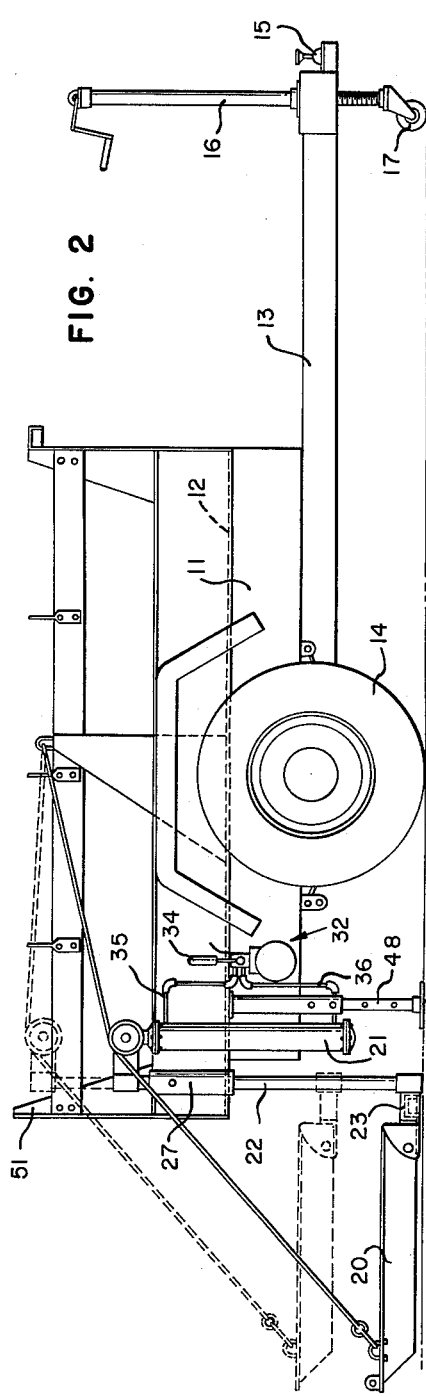
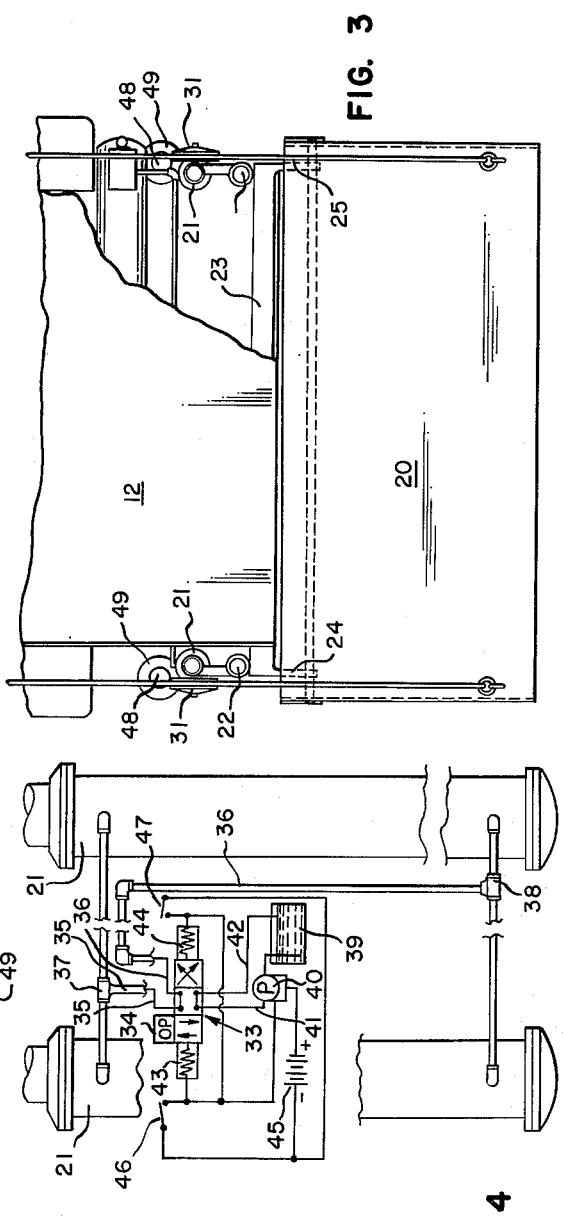
INVENTOR.
DOMINIC PIETROROIA
BY
*Mellin and Hanscom*
ATTORNEYS 3,243,060
VERTICAL GATE LIFT APPARATUS
Dominic Pietroroia, 138 39th Ave., San Mateo, Calif.
Filed Jan. 13, 1964, Ser. No. 337,456
6 Claims. (Cl. 214—75)

This invention relates to vehicles equipped with lifting platforms. The invention more particularly involves a tail gate lifting platform that may be attached or used with trucks or trailers.

Although many forms of lifting apparatus are known which may be used in connection with vehicles, conventional apparatus requires that it be incorporated as original equipment at the time of manufacture. If otherwise, the total cost of new apparatus and the cost of fitting it to an existing truck or vehicle becomes excessive and, therefore, commercially impractical.

In brief, the present invention comprises a tail gate pivotally mounted to a tail gate support with means including a pair of fluid cylinders for movably mounting the tail gate and its support from the body of a conventional truck or trailer. In addition, a cable connected intermediate the tail gate and the vehicle body maintains the tail gate in an essentially horizontal plane while it is lifted from engagement with the ground to a level coplanar with the bed of the vehicle. This same cable support also provides a counterbalance for the load-torque applied to the gate-lifting cylinders, thereby preventing unnecessary bending and distortion of the supporting apparatus.

A principal object of this invention is to provide a tail gate-lifting support and mounting apparatus that may be economically attached to many kinds of standard vehicle constructions.

Another object is to provide a tail gate and supporting apparatus for vehicles that is rigidly constructed and may be used for supporting loads in excess of several thousand pounds.

A further object of the invention is to provide apparatus of the kind described wherein the tail gate may be locked in a horizontal position coplanar with the bed of the vehicle, although normally supported by a pair of fluid cylinders.

It is another further object of this invention to provide apparatus of the kind described including a pair of adjustable feet which may be lowered into engagement with the ground to provide stabilizing support as the tail gate and a supported load are being lifted.

Another object is to provide an apparatus of the kind described wherein the downstroke of gate-lifting cylinders may be used as a hydraulic jack for temporarily supporting the body of the vehicle.

Other objects of this invention will become apparent in view of the following detailed description and the accompanying drawings.

In the drawings forming a part of this application and in which like parts are identified by like reference numerals throughout the same, FIG. 1 is a side elevation of a preferred embodiment of the invention as used with two-wheeled trailers;

FIG. 2 is a second side view of the trailer showing the tail gate and actuating mechanism after the gate has been lowered to ground level;

FIG. 3 is a partial plan view of the trailer and tail gate with a portion of the bed broken away;

FIG. 4 is a schematic drawing illustrating a portion of the fluid cylinders and an operating circuit therefor.

Figure 1:
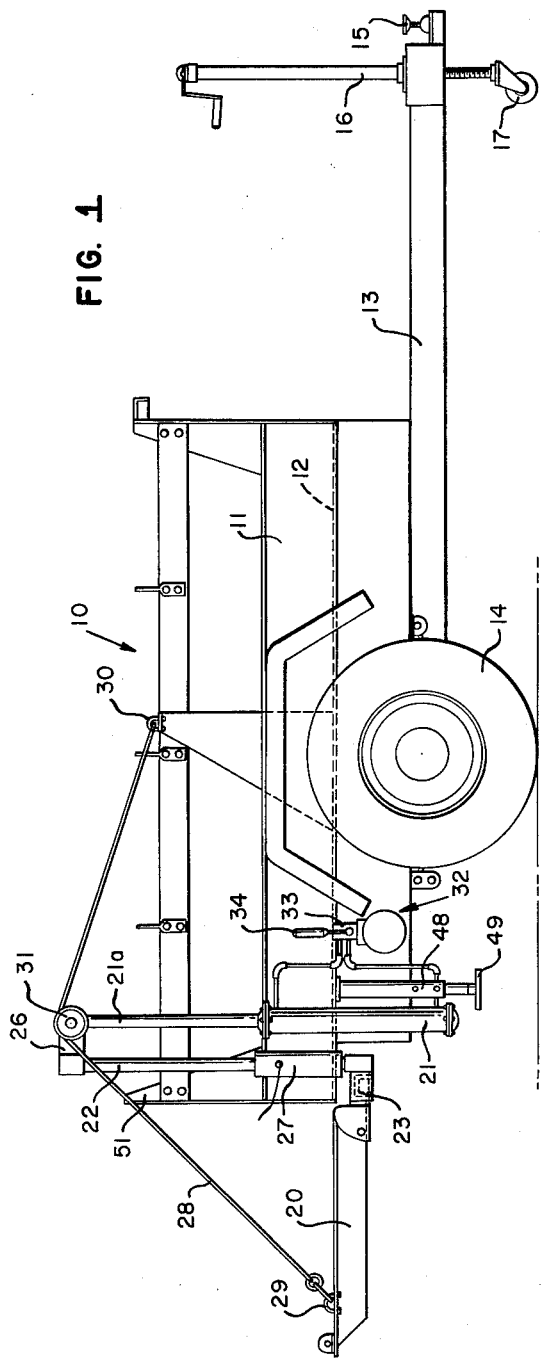

Referring to FIG. 1, there is illustrated a standard type trailer vehicle generally indicated by reference number 10.

The trailer is essentially conventional, comprising a body 11 having a bed 12, a support frame 13, ground engaging wheels 14, and a trailer coupling 15. A screw jack 16 mounted to support frame 13 adjacent coupling 15 carries a retractible wheel 17, which may be lowered into engagement with the ground for maintaining bed 12 in a horizontal plane when the trailer hitch 15 is uncoupled from a towing vehicle, as shown.

This invention is more particularly concerned with the operation of a tail gate 20, and a gate-lifting support that essentially comprises a pair of fluid cylinders 21, support rods 22, and a transverse support member 23. Gate 20 is pivotally hinged to ears 24 and 25, each ear being secured to transverse member 23 and vertical support rods 22. The upper end of rods 22 are rigidly connected to the movable piston rods 21a of cylinders 21, respectively, by a connector piece 26; and each rod 22 is vertically guided by a sleeve 27 mounted to body 11 in parallel relation to cylinders 21.

The supporting apparatus for tail gate 20 further includes a pair of cables 28, each cable having one end connected to the tail gate by a U-bolt 29 and the other end secured to an anchorage on the body 11 by a U-bolt 30. Cables 28 are, moreover, entrained around pulleys 31 mounted at the upper end of fluid cylinders 21, respectively; and as the tail gate 20 is raised and lowered between the extreme positions of FIGS. 1 and 5, cables 28 will maintain the tail gate in a substantially horizontal position. Furthermore, cables 28 provide a force that will counterbalance the load-torque of an object resting on tail gate 20 and which is primarily supported by cylinder 21.

Cylinders 21 are operated by a conventional hydraulic power unit 32, including a directional control valve 33 having a manual operator 34. Cylinders 21 fluidly communicate with the control valve 33 by means of pressure lines 35 and 36.

Referring to FIG. 4 in particular, T-couplings 37 and 38 are employed for communicating lines 35 and 36 to both cylinders 21; and valve 33 is connected in a fluid power circuit comprising a reservoir 39, a pump 40, pressure line 41 and a return line 42. As shown by the schematic drawing, valve 33 may be a three-way spool valve having a neutral position that circulates fluid from pump 40 back to reservoir 39. Although the valve is biased into a neutral position by springs 43 and 44, manual operator 34 may be used to position the valve spool in either of the other two positions. Moving the valve spool against the bias of spring 44 connects pressure line 41 to line 35 while simultaneously connecting return line 42 to fluid line 36. A reverse movement of operator 34 from its neutral position will compress spring 43, connecting line 41 with fluid line 36 and return line 42 with fluid line 35.

The operation of valve 33 by means of manual operator 34 is also used for electrically connecting pump 40 to a battery power source 45. For this purpose, control valve 33 may be of the kind having spool actuated contacts 46 and 47, each contact being connected in parallel with each other and in series with the motor of pump 40 and battery 45. Accordingly, conditioning valve 33 to transmit fluid into either end of cylinders 21 will simultaneously energize the motor of pump 40. Although specific details of a control valve 33 have been indicated, the manner of its construction is conventional and forms no part of the present invention, except as it forms part of the operating apparatus in the preferred form of the invention shown and described. Moreover, it is to be understood, of course, that various control valves or operating circuitry may be provided within the ambit of this invention.

Figure 5:
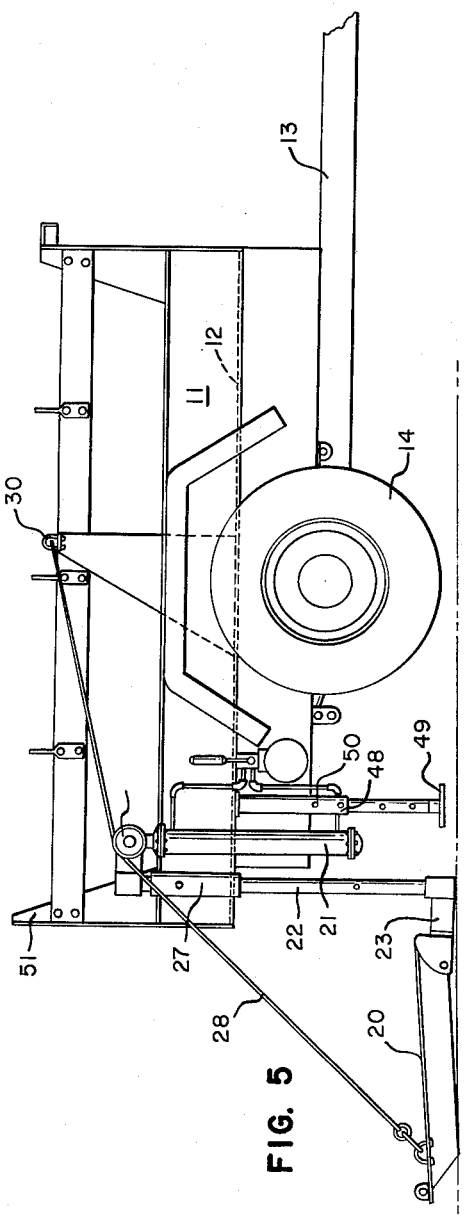
FIG. 5 is a side elevation of the trailer illustrating how the fluid cylinders may be used as hydraulic jacks for supporting the trailer upon gate supporting members.

Cylinders 21 are preferably selected and mounted to body 11 so that their upward stroke places transverse support 23 into proximate relation with the lower surface of bed 12 while positioning the supporting surface of tail gate 20 in coplanar relationship with the supporting surface of bed 12. The length of the cylinder stroke must, therefore, be no shorter than the distance required to move tail gate 20 from the position of FIG. 1 to the position shown in FIG. 2, where the tail gate first comes into engagement with the ground. However, it is desirable to make the length of the cylinder stroke slightly greater, allowing vertical rods 22 and the bottom surface of transverse support 23 to serve as a supporting leg for the trailer body. This position of operation is shown in FIG. 5 where the weight of vehicle 10 is supported entirely upon the rods 22 with wheels 14 being lifted off the ground. This arrangement has the advantage that cylinders 21 function both as a source of power for lifting tail gate 20 and also serves as a hydraulic jack for trailer 10.

It is contemplated that a preferred form of the apparatus may include a pair of telescopic support feet 48, each foot being mounted adjacent one of the cylinders 21 and adapted to be lowered into engagement with the ground. Support feet 48 are of particular value in connection with a two-wheeled trailer, as shown, and in operation are lowered into engagement with the ground prior to lifting a heavy load upon tail gate 20. Since two-wheeled vehicles are normally constructed with a center of gravity disposed adjacent to or nearly over the axle of wheels 14, an attempt to lift a heavy load on tail gate 20 would tend to tilt the trailer, as a whole, about the point of contact made between wheels 14 and the ground. However, the use of auxiliary support feet 48 provides a point of ground contact that essentially prevents backward tilting of the trailer, especially when the trailer has been uncoupled from its towing vehicle.

Support feet 48 may be constructed from a pair of telescopic cylinders, the inner cylinder extending downwardly out of the outer cylinder and provided with a ground engaging foot plate 49. This arrangement permits the cylinders to be pin-connected as with a transverse pin 50 either in a raised position, FIG. 1, or with the inner cylinder extended, FIGS. 2 and 5.

When tail gate 20 is to be used in the true sense of a tail gate, rather than as a lifting or support platform, it may be pivoted upon its base hinge into a vertical position and pinned to uprights 51. Furthermore, when the trailer is being towed with tail gate 20 raised, transverse safety pins 52 may be placed through aligned openings in rods 22 and their guide sleeves 27. This structure will prevent inadvertent lowering of the tail gate in case of fluid leakage in cylinders 21.

Although a preferred embodiment of this invention has been illustrated and described, it is to be understood that various changes may be made without departing from the spirit of the invention or the scope of the attached claims, and each of such changes is contemplated.

What I claim and desire to secure by Letters Patent is:

1. In combination with a vehicle having a body including a support frame and a bed; a tail gate support; means including a pair of fluid cylinders for mounting said tail gate support from said body and for lifting or lowering said support perpendicularly relative to said bed; a tail gate pivotally hinged to said tail gate support; and means including a cable connected intermediate said tail gate and body and a cable guide mounted to said tail gate support, said cable being entrained over said cable guide, for maintaining said tail gate in an essentially horizontal plane while counter-balancing the load-torque applied to said pair of fluid cylinders.

2. The combination of claim 1 wherein said gate support comprises a pair of elongated vertical rods connected at their lower ends by a transverse support member, and further including a pair of guides, one for each rod, said guides being mounted to the body of said vehicle.

3. The combination of claim 2 and further including means for pin-supporting said rods to their respective guides when the bottom edge of said tail gate is supported essentially coplanar with the bed of said vehicle.

4. The combination of claim 2 wherein the lifting stroke of said cylinders are of a maximum length as to place the transverse support member into proximate relation with the bottom of said bed, positioning said tail gate into coplanar relationship to the supporting surface of said bed.

5. The combination of claim 2 wherein the stroke of said cylinders are of a length sufficient to drive the elongated vertical rods into the ground and elevate the body of said truck.

6. The combination of claim 1 and further including a pair of feet mounted to the body of said vehicle, one of said pair of feet being mounted adjacent each cylinder and adapted to be lowered into engagement with the ground for supporting said body with its bed horizontally disposed.

No references cited.

GERALD M. FORLENZA, *Primary Examiner.*

M. TEMIN, *Assistant Examiner.*